US006404967B2

(12) United States Patent
Arai et al.

(10) Patent No.: US 6,404,967 B2
(45) Date of Patent: Jun. 11, 2002

(54) OPTICAL FIBER AND OPTICAL TRANSMISSION LINE USING THE SAME

(75) Inventors: Shinichi Arai; Ryuichi Sugizaki; Keiichi Aiso, all of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/760,822

(22) Filed: Jan. 17, 2001

Related U.S. Application Data

(63) Continuation of application No. PCT/JP00/03148, filed on May 17, 2000.

(30) Foreign Application Priority Data

Apr. 19, 2000 (JP) .......................................... 2000-118217
May 17, 2000 (JP) ............................................ 11-135799

(51) Int. Cl.$^7$ ................................................ G02B 6/02
(52) U.S. Cl. ..................................... 385/126; 359/161
(58) Field of Search ................................. 385/123–129, 385/140, 141, 142, 143, 25–29; 372/6; 359/161, 171, 172, 179, 189, 195

(56) References Cited

U.S. PATENT DOCUMENTS

| 4,715,679 | A |   | 12/1987 | Bhagavatula |         |
|-----------|---|---|---------|-------------|---------|
| 5,361,319 | A |   | 11/1994 | Antos et al. |        |
| 5,448,674 | A |   | 9/1995  | Vengsarkar et al. |  |
| 5,838,867 | A |   | 11/1998 | Onishi et al. |      |
| 6,044,191 | A | * | 3/2000  | Berkey et al. | 385/123 |
| 6,317,551 | B1 | * | 11/2001 | Mitchell et al. | 385/124 |
| 6,324,327 | B1 | * | 11/2001 | Herring et al. | 385/123 |
| 6,339,665 | B1 | * | 1/2002  | Danziger | 359/161 |

FOREIGN PATENT DOCUMENTS

| EP | 0 598 554 A1 | 5/1994 |
| JP | 10319266 | 12/1998 |
| JP | 11-507445 | 6/1999 |
| JP | WO 00/17684 | 3/2000 |
| WO | WO 98/04941 | 7/1997 |

OTHER PUBLICATIONS

Dispersion–compensating single–mode fibers: efficient designs for first– and second–order compensation, Ashish M. Vengsarkar and W.A. Reed, Optics Letters / vol. 18, No. 11 / Jun. 1, 1993.

Broadband dispersion–compensating fiber for high–bit–rate transmission network use, V.A. Semenov, et. al., Applied Optics / vol. 34, No. 24 / Aug. 20, 1995.

\* cited by examiner

*Primary Examiner*—Akm E. Ullah
(74) *Attorney, Agent, or Firm*—Oblon, Spivak, McClelland, Maier & Neustadt, P.C.

(57) ABSTRACT

The present invention provides an optical fiber which has negative dispersion and negative dispersion slope in a wavelength band in use, and can carry out single-mode operation in which distortion due to the non-linear phenomenon can be suppressed so as to be suitable for wavelength multiplexed optical transmissions. When the relative index differences of center core (1), first side core (2), second side core (3), and inner cladding (4) from the silica level are $\Delta 1$, $\Delta 2$, $\Delta 3$, and $\Delta 4$, $1.7\% \leq \Delta 1$, $\Delta 2 \leq -0.3\%$, $0.25\% \leq \Delta 3$, and $\Delta 4<0$. Furthermore, the value A, determined by dividing the diameter a1 of the center core 1 by the diameter a2 of the first side core 2, is set to $0.15 \leq A \leq 0.2$, and the value B, determined by dividing the diameter a3 of the second side core 2 by the diameter a2 of the first side core 3, is set to $1<B \leq 2$. By such an arrangement, the absolute values of the negative dispersion and negative dispersion slope in a wavelength band of 1.55 $\mu$m can be made large, and in addition, light is confined within the core by the second side core (3), the effective core sectional area is made larger, and inner cladding (4) is provided, whereby the effective cut-off wavelength is shortened.

18 Claims, 4 Drawing Sheets

(a)

(b)

OPTICAL FIBER AND OPTICAL TRANSMISSION LINE USING THE SAME

This application is a continuation of application Ser. No. PCT/JP00/03148, filed May 17, 2000.

TECHNICAL FIELD

The present invention relates to an optical fiber which is suitable for wavelength multiplexed optical transmissions in, for example, a wavelength band of a 1.55 μm wavelength and a wavelength multiplexed optical transmission line using the same optical fiber.

BACKGROUND ART

As a transmission network for optical transmissions, a single-mode optical fiber having zero dispersion in a wavelength band of a 1.3 μm wavelength has been laid across the world. Recently, in accordance with development of the information society, information transmission capacities tend to significantly increase. In accordance with such an increase in information, wavelength multiplexed transmissions (WDM transmissions) are widely accepted in the transmission field, and now the age of wavelength multiplexed transmissions has been entered. Wavelength multiplexed transmissions are the method for transmitting a plurality of light signals which are not on one wavelength but are divided into a plurality of wavelengths, which is suitable for large-capacity and high-rate transmissions.

However, in the case where an existing single-mode optical fiber in operation for transmissions which has zero dispersion near 1.3 μm is used and a wavelength band near 1.3 μm is used to carry out wavelength multiplexed optical transmissions, this wavelength band does not coincide with the 1.55 μm wavelength band (for example, 1530 nm to 1570 nm) of the gain bandwidth (including 1500 nm to 1650 nm) of a general optical amplifier using an erbium doped optical fiber. Therefore, in the case where optical transmissions are carried out by using a wavelength band near 1.3 μm, the optical amplifier cannot be used, and therefore, trouble may occur in long-distance optical transmissions. In order to solve this problem, recently, wavelength multiplexed optical transmissions in a wavelength band of 1.55 μm are carried out by using an optical amplifier and an existing single-mode optical fiber having zero dispersion in a wavelength band of 1.3 μm.

However, when optical transmissions are carried out in a wavelength band of 1.55 μm by using the single-mode optical fiber having zero dispersion near 1.3 μm, the existing single-mode optical fiber has positive dispersion of approximately 17 ps/nm/km in a central wavelength of 1.55 μm of the wavelength band of 1.55 μm, and furthermore, the single-mode optical fiber has a positive dispersion slope of approximately 0.06 ps/nm$^2$/km in a wavelength band of 1.55 μm. Therefore, distortion in waveform of the light signals of the respective multiplexed wavelengths increases as the light signals are transmitted in the single-mode optical fiber, separation and distinction of the signals at the receiver side become difficult, the quality of optical transmissions deteriorates, and the reliability of optical transmissions is lost.

Furthermore, as a transmission network for optical transmissions, a dispersion shifted optical fiber whose wavelength of zero dispersion is shifted to be close to 1.55 μm which is the gain bandwidth of an optical amplifier has been proposed. When dispersion in wavelength in optical transmissions becomes close to zero, since a non-linear phenomenon called four wave mixing becomes easy to generate, in particular, in wavelength multiplexed transmissions, a dispersion shifted optical fiber having minute dispersion of a degree at which a non-linear phenomenon is not generated in the wavelengths for optical transmissions has been demanded.

However, if a dispersion shifted optical fiber having the abovementioned minute dispersion is used for long-distance optical transmissions, since the influence of the minute dispersion cannot be ignored, it is difficult to dependently use the dispersion shifted optical fiber having minute dispersion for long-distance large-capacity and high-rate transmissions.

Therefore, in order to solve such a problem, a method has been proposed in which, to compensate for dispersion in the wavelength band of 1.55 μm of a 1.3 μm zero dispersion single-mode optical fiber, an optical fiber having great negative dispersion in the wavelength band of 1.55 μm is inserted into the single-mode optical fiber transmission line, whereby positive dispersion in the wavelength band of 1.55 μm of the single-mode optical fiber is compensated, and deterioration in transmission signals due to chromatic dispersion is suppressed.

As an example of the optical fiber for compensating the dispersion, for example, an optical fiber having a refractive index profile of a single-peak form as shown in FIG. 6 has been proposed. The optical fiber having a refractive index profile of a single-peak form is formed by covering the circumference of center core 1 with a refractive index greater than that of the silica level with outer cladding 5. The optical fiber of the proposed example is formed so that the refractive index of the outer cladding 5 is smaller than that of the silica glass.

However, the dispersion value of the optical fiber having a refractive index profile of a single-peak form in the wavelength band of 1.55 μm is approximately –80 ps/nm/km at most as a limit value in practical use, and therefore, an optical fiber having a smaller dispersion value (absolute value of negative dispersion is great) cannot be realized by means of a refractive index profile of a single-peak form. Therefore, in order to compensate for the positive dispersion of the single-mode optical fiber by an optical fiber with a refractive index profile of a single-peak form, the length required for the optical fiber for dispersion compensation increases, so that it is difficult to reduce the size of an optical fiber for dispersion compensation in which the abovementioned optical fiber is coiled and housed.

Furthermore, in the optical fiber with a refractive index profile of a single-peak form, the dispersion slope in the wavelength band of 1.55 μm is positive, so that it is difficult to compensate for the chromatic dispersion of the single mode optical fiber over a broadband of a 1.55 μm wavelength band.

Therefore, an optical fiber having a W-formed refractive index profile as shown in FIG. 7 has been proposed. The optical fiber having a W-formed refractive index profile is formed so that the circumference of center core 1 with a refractive index greater than that of the cladding level is covered by side core 12 having a refractive index smaller than that of the cladding level, and normally, the circumference of the side core 12 is covered by outer cladding 5 having a refractive index which is almost equal to that of the silica level.

In the optical fiber having the W-formed refractive index profile, the dispersion value in the wavelength band of 1.55 μm can be smaller (absolute value of negative dispersion can be made greater) than that of the optical fiber having a refractive index profile of a single-peak form, whereby an optical fiber whose dispersion value at the wavelength of 1.55 μm is approximately −120 ps/nm/km has become practicable. Furthermore, in the optical fiber having the W-formed refractive index profile, the dispersion slope in the wavelength band of 1.55 μm can be made negative, whereby the positive dispersion slope of the single-mode optical fiber can be compensated to a degree for practical use, so that dispersion over a broadband of a 1.55 μm wavelength can be compensated more than in the case of the optical fiber having a refractive index profile of a single-peak form.

Moreover, for example, in Japanese Laid-Open Patent Publication No. 313750 of 1996, a method is proposed in which an optical fiber having a W-formed refractive index profile whose detailed structure is properly determined is used to compensate for the chromatic dispersion and dispersion slope in the wavelength band of 1.55 μm of the single-mode optical fiber, whereby the chromatic dispersion and dispersion slope in the wavelength band of 1.55 μm are compensated to be almost zero. In addition, a report was presented in Electro-society Convention C-172 1996 by the Electronic Information Transmission Society, stating that chromatic dispersion in a wavelength band of 1500 to 1600 nm was suppressed to be −1 to 0ps/nm/km by compensating the dispersion of the single-mode optical fiber by using an optical fiber having a W-formed refractive index profile.

However, the optical fiber having the W-formed refractive index profile is difficult to form so that a negative dispersion slope is provided which can completely compensate for the positive dispersion slope of an optical fiber to be compensated at the wavelength of 1.55 μm being the central wavelength of the wavelength band of 1.55 μm, and dispersion is less than −120 ps/nm/km.

Therefore, also in the case of using the optical fiber having the W-formed profile, the length of optical fiber required for compensation of dispersion of the single-mode optical fiber increases, so that it is difficult to reduce the size of an optical fiber module which is formed by coiling and housing said optical fiber in a case.

Furthermore, in both cases of the single-peak form and W-form of the prior-art optical fibers, the range of light transmission (effective core sectional area) in the single-mode is small, the power density of the light transmitted inside the optical fiber is high, and in addition, as mentioned above, the length of the optical fiber used is long, so that the non-linear phenomenon is easily generated inside the optical fiber. If so, distortion in signal waveform occurs due to this non-linear phenomenon, whereby transmissions cannot be correctly carried out, and therefore, the use of the dispersion compensating device using the optical fibers is inevitably limited.

Moreover, it also can be considered that deterioration of transmission signals due to chromatic dispersion is prevented by using the optical fiber for compensating dispersion of a dispersion shifted optical fiber having minute dispersion, however, it is considered difficult to completely compensate for the dispersion and dispersion slope of a dispersion shifted optical fiber having minute dispersion by the optical fiber having a single-peak or W-formed refractive index profile.

The invention is made in order to solve the abovementioned problems, and a first object thereof is to provide an optical fiber which is short and can compensate for positive dispersion of a single-mode optical fiber having a zero dispersion wavelength at the side of a wavelength shorter than the wavelength band in use at a broadband of the wavelength band in use, and an optical fiber whose effective core sectional area is large, and which can reduce distortion in signal waveforms due to the non-linear phenomenon. A second object is to provide an optical transmission line, in which distortion in signal waveforms due to dispersion over a broadband of a wavelength band in use and distortion in signal waveforms due to the non-linear phenomenon are less, and which is suitable for wavelength multiplexed transmissions.

DISCLOSURE OF INVENTION

In order to achieve the above objects, the above problems are solved by the following constructions of the invention. That is, a first construction of the optical fiber of the invention is characterized in that, the optical fiber is formed so that the outer circumferential side of the center core is covered by a first side core, the outer circumferential side of said first side core is covered by a second side core, and the outer circumferential side of said second side core is covered by an outer cladding, wherein, when the maximum refractive index of the center core is n1, the minimum refractive index of the first side core is n2, the maximum refractive index of the second side core is n3, and the refractive index of the outer cladding is nc, n1>n3>nc>n2, and when the relative index difference of the center core from the outer cladding is Δ1, the relative index difference of the first side core from the outer cladding is Δ2, and the relative index difference of the second side core from the outer cladding is Δ3, $1.7\% \leq \Delta 1$, $\Delta 2 \leq -0.3\%$, and $0.25\% \leq \Delta 3$, and furthermore, a value A determined by dividing the diameter a1 of the center core by the diameter a2 of the first side core is $0.15 \leq A \leq 0.5$, and a value B determined by dividing the diameter a3 of the second side core by the diameter a2 of the first side core is $1 < B \leq 2$.

Preferably, the second side core has one or more extremely-large refractive index portions, and of the one or more extremely-large refractive index portions, maximum refractive index points are positioned at the side of the first side core from the center of the width in the direction of the diameter of the second side core.

More preferably, the outer circumferential side of the second side core is covered by an inner cladding, the outer circumferential side of said inner cladding is covered by the outer cladding, and the refractive index of the inner cladding is set to be smaller than that of the outer cladding.

In addition, chromatic dispersion in the wavelength band in use is set to be less than −120 ps/nm/km.

Furthermore, a D/S value determined by dividing the chromatic dispersion D in a wavelength band in use by the chromatic dispersion slope S is set to be 0 to 500 nm, more preferably, 0 to 300 nm.

It is extremely preferable that the wavelength band in use of the optical fiber of the invention is set to be a wavelength band of 1.55 μm.

Moreover, a first construction of the optical transmission line of the invention is characterized in that the dispersion slope in the wavelength band in use is reduced to be almost zero by connecting the optical fiber of the invention to a single-mode optical fiber having zero dispersion in a wavelength band at the side of a wavelength shorter than the wavelength band in use.

Furthermore, a second construction of the optical transmission line of the invention is characterized in that the optical fiber of the abovementioned construction of the invention and an optical fiber whose D/S value determined by dividing chromatic dispersion D in the wavelength band in use by the chromatic dispersion slope S is larger than 300 nm or an optical fiber whose D/S value is negative are connected to a single-mode optical fiber having zero dispersion in a wavelength band at the side of a wavelength shorter than the wavelength band in use.

The present inventor noticed that the absolute value of negative dispersion per unit length in the wavelength band of 1.55 μm could be made to be relatively large if the refractive index profile of an optical fiber was formed as a W-formed refractive index profile, and examined change in the absolute value of negative dispersion per unit length in the wavelength band of 1.55 μm when the detailed structure of the W-shaped refractive index profile was changed. As a result, the inventor could confirm that the absolute value became larger when the core diameter including the center core and side core was reduced. However, in this case, it was proved that the light confinement effect into the center core with a high refractive index became weaker, and the light transmission conditions were not satisfied, so that light was not transmitted, or although light was transmitted, the macrobend loss increased extremely, and therefore, it became impossible to coil the optical fiber to form a dispersion compensated module.

Therefore, a method was established in that, at the outer circumference of the side core in the W-formed refractive index profile, a segment core having a refractive index higher than that of the side core was provided, and light which leaked from the center core of the W-formed refractive index profile and could not be transmitted was confined (not allowed to escape to the cladding side) by the segment core with a high refractive index, whereby the light was transmitted and the abovementioned macrobend loss was reduced. In addition, it was proved that, by this method, light was transmitted while spreading toward portions other than the center portion of the center core, whereby the effective core sectional area substantially became larger, and the power density of the light to be transmitted was reduced.

Based on the abovementioned examination, in the optical fiber of the invention, side core 12 in the W-formed refractive index profile is referred to as a first side core, the segment core is referred to as a second side core, and the relationship between the maximum refractive index n1 of the center core, the minimum refractive index n2 of the first side core, the maximum refractive index n3 of the second side core, and the refractive index nc of the outer cladding is set to n1>n3 >nc>n2. In addition, the value A determined by dividing the diameter a1 of the center core by the diameter a2 of the first side core is set to $0.15 \leq A \leq 0.5$, the value B determined by dividing the diameter a3 of the second side core by the diameter a2 of the first side core is set to $1<B\leq 2$, whereby enlargement of the effective core sectional area is made possible.

Furthermore, by concretely determining the relative index difference Δ1 of the center core from the outer cladding, the relative index difference Δ2 of the first side core from the outer cladding, and the relative index difference Δ3 of the second side core from the outer cladding to be $1.7\% \leq \Delta 1$, $\Delta 2 \leq -0.3\%$, and $0.25\% \leq \Delta 3$, respectively, the dispersion value per unit length of the optical fiber can be made as small as, for example, less than –120 ps/nm/km (the absolute value of negative dispersion can be made larger), and the absolute value of the negative dispersion slope can be made larger.

By optimizing the refractive index profile based on the abovementioned examination by the present inventor, in the optical fiber of the invention, since the absolute value of negative dispersion per unit length in the wavelength band in use and the absolute value of the negative dispersion slope are made large, the optical fiber can be formed so that the positive dispersion of a 1.3 μm band zero dispersion single-mode optical fiber can be compensated over a broadband of a wavelength band of 1.55 μm, for example, or distortion due to the non-linear phenomenon can be reduced by enlarging the effective core sectional area.

In addition, according to the optical fiber arranged so that the second side core is provided with one or more extremely-large refractive index portions, in comparison with an optical fiber in which the second side core is flat in refractive index profile and has no extremely-large refractive index portions, the absolute value of negative dispersion and the absolute value of dispersion slope can be made large.

Furthermore, according to the optical fiber arranged so that the maximum refractive index points of one or more extremely-large refractive index portions of the second side core are at the side of the first side core from the center part in the diameter direction of the second side core, an optical fiber is more securely realized in which, while the effective cut-off wavelength is maintained at the short wavelength side, the absolute value of negative dispersion and the absolute value of the negative dispersion slope are made large.

Furthermore, according to an optical fiber arranged so that the outer circumferential side of the second side core is covered by an inner cladding, the outer circumferential side of said inner cladding is covered by an outer cladding, and the refractive index of the inner cladding is set to be smaller than that of the outer cladding, and by providing the inner cladding, light of an $LP_{11}$ mode having electric field distribution over a wide range in the direction of the core diameter is made to easily leak to shorten the effective cut-off wavelength, whereby an optical fiber can be more securely realized in which the absolute value of negative dispersion and the absolute value of the negative dispersion slope are large while an operation in the single-mode can be performed without fail.

Furthermore, according to the optical fiber arranged so that chromatic dispersion in the wavelength band in use is set to be less than –120 ps/nm/km, the absolute value of the negative chromatic dispersion in the wavelength band in use is thus made large, whereby positive dispersion of a 1.3 μm band zero dispersion single-mode optical fiber can be compensated by the short optical fiber.

Furthermore, according to the optical fiber, the D/S value of which is determined by dividing chromatic dispersion D in the wavelength band in use by the chromatic dispersion slope S is set to 0 to 500 nm, positive dispersion of an optical fiber such as a 1.3 μm band zero dispersion single-mode optical fiber can be compensated by the short optical fiber. Particularly, according to an optical fiber whose D/S value is set to 0 to 300 nm, the positive dispersion and positive dispersion slope of a 1.3 μm band zero dispersion single-mode optical fiber can be compensated by the optical fiber with a shorter length.

Furthermore, according to the optical fiber whose wavelength band in use is set to a wavelength band of 1.55 μm, by applying this optical fiber for wavelength multiplexed optical transmissions using an optical amplifier equipped with an erbium doped optical fiber, the positive dispersion and positive dispersion slope of a 1.3 μm band zero dispersion single-mode optical fiber can be compensated by the short optical fiber.

Furthermore, according to the optical transmission line of the invention, by using the abovementioned optical fiber, the dispersion and dispersion slope over a broadband of the wavelength band in use can be reduced to be almost zero, so that an optical transmission line suitable for wavelength multiplexed transmissions in which distortion due to dispersion is less can be obtained, and in particular, according to the optical transmission line arranged so that the dispersion slope and dispersion value in the wavelength band in use are reduced to be almost zero, by reducing both dispersion and dispersion slope to be almost zero, an optical transmission line extremely suitable for wavelength multiplexed transmissions in which distortion due to dispersion is almost zero.

BEST MODE FOR CARRYING OUT THE INVENTION

The invention shall be described in more detail with reference to the attached drawings showing the embodiments. In the description below of each embodiment, components that are the same as in the prior-art example have the same symbols attached, and overlapping description thereof is omitted or simplified.

Figure 1:
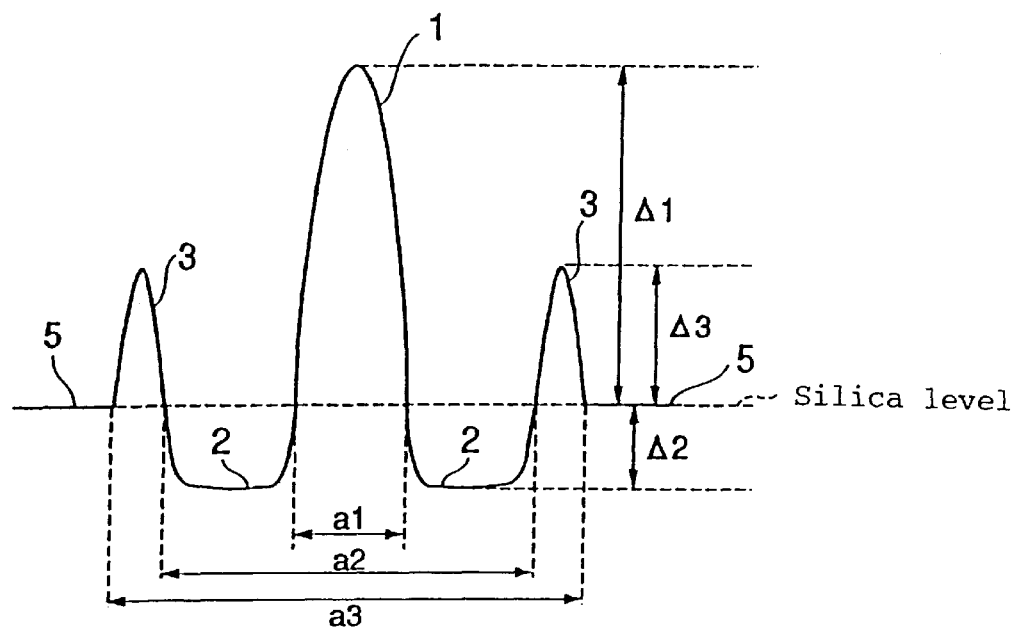
FIG. 1 is a constructional diagram showing the refractive index profile of the first embodiment of the optical fiber relating to the invention.

FIG. 1 shows the refractive index profile of the first embodiment of the optical fiber relating to the invention. As shown in the same figure, the optical fiber of the present embodiment is formed so that the outer circumferential side of the center core 1 is covered by the first side core 2, the outer circumferential side of the first side core 2 is covered by the second side core 3, and the outer circumferential side of the second side core 3 is covered by outer cladding 5. The outer cladding 5 is formed from silica, the center core 1 and second side core 3 are formed so as to have refractive indexes higher than that of silica, and the first side core 2 is formed so as to have a refractive index lower than that of silica. The relationship between refractive index (maximum refractive index) n1 of the center core 1, the refractive index (minimum refractive index) n2 of the first side core 2, the refractive index (maximum refractive index) n3 of the second side core, and the refractive index nc of outer cladding 5 is n1>n3>nc>n2. These refractive indexes are values when the refractive index in vacua is 1.

Furthermore, when the relative index difference of the center core 1 from the cladding level (that is, the comparative refractive index difference of the center core 1 from the outer cladding 5) is Δ1, the relative index difference of the first side core 2 from the cladding level (that is, the relative index difference of the first side core 2 from the outer cladding 5) is Δ2, and the relative index difference of the second side core 3 from the cladding level (that is, the relative index difference of the second side core 3 from the outer cladding 5) is Δ3, the optical fiber is formed so that $1.7\% \leq \Delta1$, $\Delta2 \leq -0.3\%$, and $0.25\% \leq \Delta3$.

The respective relative index differences Δ1, Δ2, and Δ3 are defined by the following formulas (1) through (3), and the formulas are in units of %.

$$\Delta1=[\{(n1)^2-(nc)^2\}/\ 2(nc)^2]\times100 \quad (1)$$

$$\Delta2=[\{(n2)^2-(nc)^2\}/\ 2(nc)^2]\times100 \quad (2)$$

$$\Delta3=[\{(n3)^2-(nc)^2\}/\ 2(nc)^2]\times100 \quad (3)$$

Furthermore, in the present embodiment, the value A determined by dividing the diameter a1 of the center core by the diameter a2 of the first side core (A=a1/a2) is $0.15 \leq A \leq 0.5$, and the value B determined by dividing the diameter a3 of the second side core by the diameter a2 of the first side core (B=a3/a2) is $1<B\leq2$.

In order to realize the above refractive index profiles, in the present embodiment, the center core 1 and second side core 3 are formed from germanium-doped silica, and the first side core 2 is formed from fluorine-doped silica. In addition, the center core 1 and first side core 2 can be doped with germanium and fluorine, or the center core 1, first side core 2, and second side core 3 can be doped with germanium and fluorine.

When determining the refractive index profile of the optical fiber of the present embodiment as mentioned above, the present inventor confirmed that, if the core diameter including the center core and side core of the optical fiber of a W-formed refractive index profile was made smaller, for example, the absolute value of negative dispersion at a wavelength of 1.55 μm which is the center wavelength of the wavelength band of 1.55 μm became larger. Furthermore, in order to solve the problem due to the small core diameter, that is, in order to prevent insufficient transmission of light and an increase in macrobend loss which are caused by the light confinement effect into the center core becoming lower, it was determined that a second side core 3 with a refractive index higher than that of the first side core is provided at the outer circumference of the side core (first side core 2).

Then, as mentioned above, the relationship between the maximum refractive index n1 of the center core, the minimum refractive index n2 of the first side core, the maximum refractive index n3 of the second side core, and the refractive index nc of the outer cladding was set to n1>n3>nc>n2, and next, the concrete value of the relative index difference Δ1 of the center core (the refractive index of the center core with respect to the refractive index of the outer cladding 5) was examined. As a result, it was proved that, in the case where Δ1 was less than 1.7%, dispersion per unit length of the optical fiber in the wavelength band of 1.55 μm could not be set to be less than −120 ps/nm/km (the absolute value of negative dispersion could not be set to be larger than 120), and the macrobend loss in this wavelength band in the case of a 20 mm diameter became larger than 0.5 dB/m, so that the optical fiber thus arranged was not suitable for use in the coiled condition for compensation of dispersion. Therefore, in the present embodiment, $1.7\% \leq \Delta 1$.

Likewise, concrete values of $\Delta 2$ and $\Delta 3$ were examined, and it was proved that, when $\Delta 2$ was more than $-0.3\%$ or $\Delta 3$ was less than $0.25\%$, great negative dispersion or dispersion slope could not be obtained in the wavelength band of 1.55 μm, or the transmission loss due to bending and microbend easily increased. Therefore, in the present embodiment, $\Delta 2 \leq -0.3\%$ and $0.25\% \leq \Delta 3$.

Furthermore, it was proved that, if the value A determined by dividing the diameter a1 of the center core 1 by the diameter a2 of the first side core was less than 0.15, the second side core 3 became too distant from the center core 1, so that the light confinement effect into the core by the second side core 3 could not be utilized. Concretely, if so, the dispersion value at a wavelength of 1.55 μm became approximately −80 ps/nm/km as in the case of the optical fiber having a refractive index profile formed of a single-peak. On the other hand, it was proved that, if the value A exceeded 0.5, the effect in that the absolute value of the negative dispersion and absolute value of the negative dispersion slope of the W-formed refractive index profile could be made large in accordance with a reduction in diameter could not be obtained. Therefore, $0.15 \leq A \leq 0.5$.

Furthermore, since it was also proved that, in the case where the value B determined by dividing the diameter a3 of the second side core 3 by the diameter a2 of the first side core 2 was more than 2, the light confinement effect into the core by the second side core 3 could not utilized, and therefore, $1 < B \leq 2$.

According to the present embodiment, the ratio of refractive index profile and core diameter of the optical fiber are determined based on the above results of examination, for example, by setting the dispersion value at a wavelength of 1.55 μm which is the central wavelength of a wavelength band of 1.55 μm to be less than −120 ps/nm/km, the absolute value of negative dispersion can be made larger and the absolute value of the negative dispersion slope in a wavelength band of 1.55 μm can be made larger. Accordingly, by the optical fiber of the present embodiment which has a short length, the positive chromatic dispersion and positive dispersion slope of the single-mode optical fiber can be effectively compensated.

In addition, according to the present embodiment, the macrobend loss in the wavelength band of 1.55 μm can be reduced, so that an optical fiber which is extremely suitable for use by being coiled can be obtained.

Figure 7:
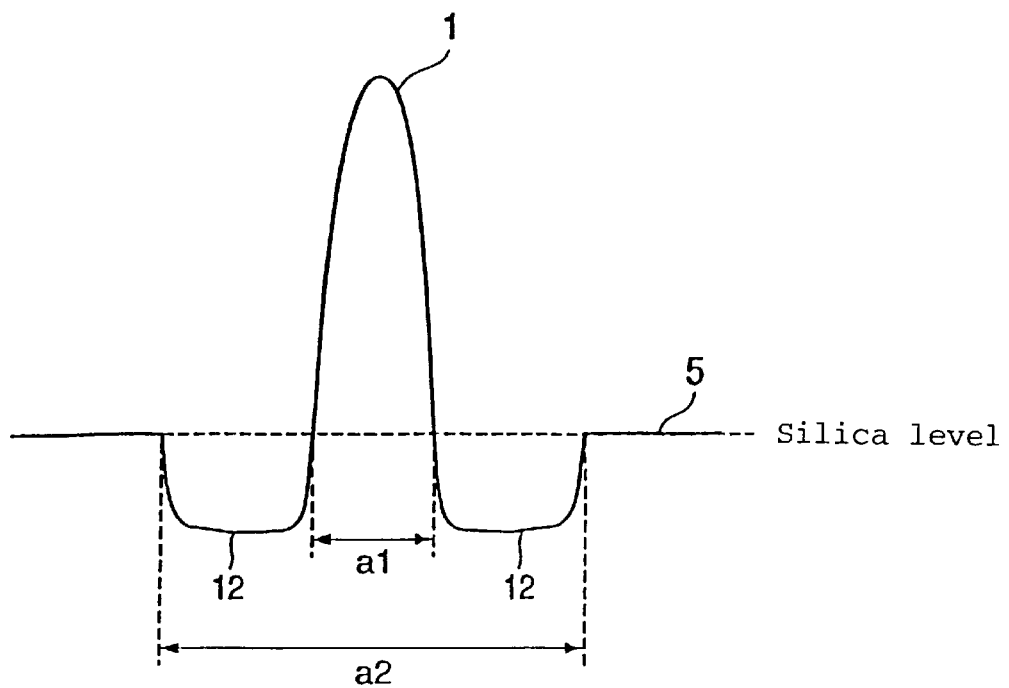
FIG. 7 is an explanatory diagram showing the refractive index profile of the optical fiber of the W-form.

Furthermore, since the refractive index profile of the present embodiment has a construction in that a core layer with a refractive index higher than that of side core layer 12 is provided at the outer circumference of the side core layer 12 whose refractive index is low in the W-formed refractive index profile shown in FIG. 7, the core layer (second side core 3) outside the core layer (first side core 2) with the low refractive index confines light that is in a condition where it has leaked from the center core of the W-formed refractive index profile and cannot be transmitted (that is, prevents light leakage toward the cladding side), whereby the light is transmitted while widely spreading to the portion other than the center of the center core 1, and therefore, the effective core sectional area is substantially increased to reduce the power density of the light to be transmitted. In the present embodiment, if the absolute value of $\Delta 3$ is set to be larger than that of $\Delta 2$, that is, if $|\Delta 3| > |\Delta 2|$, other properties when the absolute value of the negative dispersion and the absolute value of the negative dispersion slope are made large are improved. This is preferable.

CONCRETE EXAMPLES

Hereinafter, concrete examples in which the embodiments take shape shall be described. Properties of the optical fiber are shown in Table 1 as concrete examples 1 through 6 of the first embodiment when the relative index difference $\Delta 1$ of the center core 1, relative index difference $\Delta 2$ of the first side core 2, relative index difference $\Delta 3$ of the second side core 3, diameter a1 of the center core 1, diameter a2 of the first side core 2, and diameter a3 of the second side core 3 are variously changed within the abovementioned range. Units are shown in parentheses in the table.

Herein, chromatic dispersion in Table 1 is shown as a value of chromatic dispersion at a wavelength of 1.55 μm, and the dispersion slope at a wavelength of 1.55 μm is shown. D/S is the D/S value determined by dividing the dispersion value D at the wavelength of 1.55 μm by the dispersion slope S. In this specification, the D/S value, that is, the value determined by dividing the chromatic dispersion D in the wavelength band in use by the chromatic dispersion slope S shows the value determined by dividing the chromatic dispersion D at each wavelength in the wavelength band in use by the chromatic dispersion slope S at said wavelength, and its representative value is the value determined by dividing the dispersion value D at the wavelength of 1.55 μm by the dispersion slope S at the wavelength of 1.55 μm shown in Table 1.

TABLE 1

|  | $\Delta 1$ (%) | $\Delta 2$ (%) | $\Delta 3$ (%) | a1 (μm) | a2 (μm) | a3 (μm) | Chromatic dispersion (ps/km/nm) | Dispersion slope (ps/km/nm$^2$) | D/S (nm) |
| --- | --- | --- | --- | --- | --- | --- | --- | --- | --- |
| Concrete Example 1 | 2.3 | −0.45 | 0.6 | 3 | 9.6 | 12 | −187 | −0.554 | 338 |
| Concrete Example 2 | 2 | −0.45 | 0.8 | 3.13 | 10 | 12.5 | −150 | −1.410 | 106 |
| Concrete Example 3 | 2.8 | −0.55 | 0.8 | 2.5 | 8 | 10 | −265 | −0.463 | 573 |
| Concrete Example 4 | 2.74 | −0.56 | 0.75 | 2.64 | 9.4 | 11.75 | −167 | −1.017 | 165 |
| Concrete Example 5 | 2.76 | −0.54 | 0.82 | 2.53 | 8.7 | 11.43 | −215 | −0.706 | 305 |
| Concrete Example 6 | 1.7 | −0.3 | 0.5 | 3.375 | 12 | 15 | −96 | −0.637 | 151 |

Figure 6:
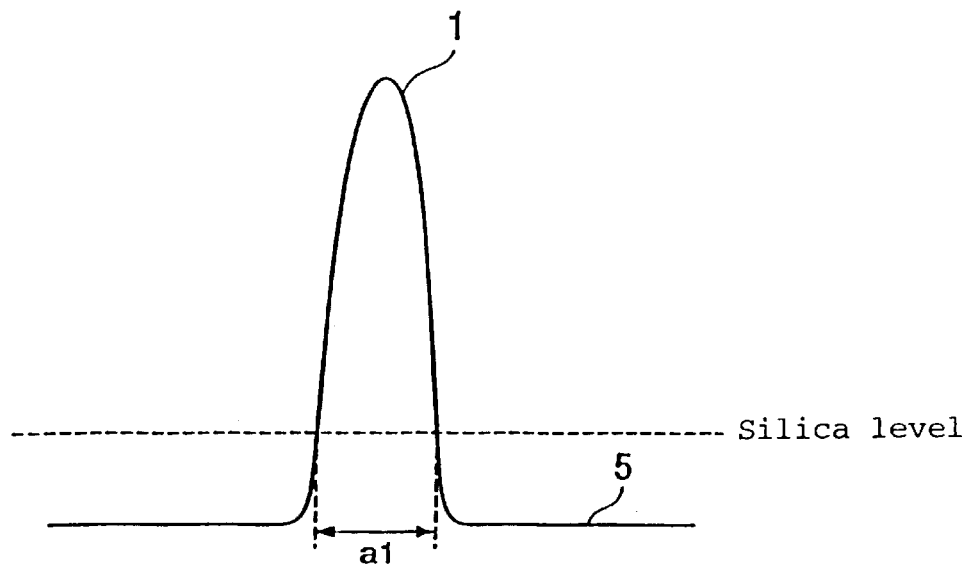
FIG. 6 is an explanatory diagram showing the refractive index profile of the optical fiber of the single-peak form.

Furthermore, in Table 2, as comparative examples, the structure and properties of an optical fiber (comparative example 1) having the single-peak refractive index profile (see FIG. 6) of a matched cladding type and the structure and properties of an optical fiber (comparative example 2) of the W-formed refractive index profile (see FIG. 7) are shown. In comparative example 1 in this table, Δ1 shows the relative index difference of the center core 1 from the silica level, Δ2 shows the relative index difference of the outer cladding 5 from the silica level, a1 is the diameter of the center core 1, and a2 is the diameter of the outer cladding 5, and in comparative example 2, Δ1 shows the relative index difference of the center core 1 from the silica level, Δ2 is the relative index difference of the side core 12 from the silica level, a1 is the diameter of the center core 1, and a2 is the diameter of the side core 12. Chromatic dispersion, dispersion slope, and D/S are determined in the same manner as in Table 1, and Aeff of Table 2 shows the effective core sectional area in the wavelength band of 1.55 μm.

TABLE 2

|  | Δ1 (%) | Δ2 (%) | a1 (μm) | a2 (μm) | Chromatic dispersion (ps/km/nm) | Dispersion slope (ps/km/nm$^2$) | D/S (nm) | Aeff (μm$^2$) |
|---|---|---|---|---|---|---|---|---|
| Comparative Example 1 | 2.8 | −0.4 | 2.5 | 125 | −78 | 0.053 | −1472 | 12.1 |
| Comparative Example 2 | 2.0 | −0.56 | 2.6 | 8.4 | −105 | −0.345 | 304 | 14.8 |

On supposition that refractive index in vacuum is 1, when the refractive index of silica is ns, the refractive index of the center core 1 is n1, the refractive index of the cladding 5 in comparative example 1, and the refractive index of the side core 12 is n2 in comparative example 2, the relative index differences Δ1 and Δ2 in Table 2 are defined by the following formulas (4) and (5), and they are in units of %.

$$\Delta 1 = [\{(n1)^2 - (ns)^2\}/2(ns)^2] \times 100 \quad (4)$$

$$\Delta 2 = [\{(n2)^2 - (ns)^2\}/2(ns)^2] \times 100 \quad (5)$$

As shown in Table 1, in all optical fibers of concrete examples 1 through 5, the chromatic dispersion at a wavelength of 1.55 μm is less than −120 ps/nm/km, the dispersion slope in the wavelength band of 1.55 μm takes a negative value, and the absolute value of the dispersion slope is more than that of comparative examples 1 and 2. In addition, in the optical fiber of concrete example 6, chromatic dispersion at the wavelength of 1.55 μm take a value more than −120 ps/nm/km, however, the absolute value of the negative dispersion slope in the wavelength band of 1.55 μm is large.

Thus, the optical fibers of the present embodiment shown by concrete examples 1 through 6 can be formed so that one or both of the absolute value of the negative dispersion at the wavelength of 1.55 μm and the absolute value of the negative dispersion slope in the wavelength band of 1.55 μm are large in comparison with comparative examples 1 and 2.

In concrete examples 2, 4, and 6, the D/S values are as small as 0 to 300. If an optical fiber, whose dispersion and dispersion slope in the wavelength band in use are negative, and a D/S value as small as 0 to 300, is used, positive dispersion and positive dispersion slope in the wavelength band of 1.55 μm of a 1.3 μm band zero dispersion single-mode optical fiber can be compensated by the abovementioned short optical fiber.

In addition, the D/S value being small and the absolute value of negative dispersion being large means that the absolute value of negative dispersion and the absolute value of the negative dispersion slope are large, so that the abovementioned effect can be obtained. The smaller the D/S value within the abovementioned range, the more the range of dispersion properties of a single-mode optical fiber being able to be compensated can be expanded and the range of the means for compensating the dispersion properties of the single-mode optical fiber can be expanded, however, for example, even when the D/S value is larger than the abovementioned range, if the D/S value is within a range of 0 to 500, the positive dispersion and positive dispersion slope in the wavelength band of 1.55 μm of a 1.3 μm band zero dispersion single-mode optical fiber can be compensated by the short optical fiber.

Figure 3:
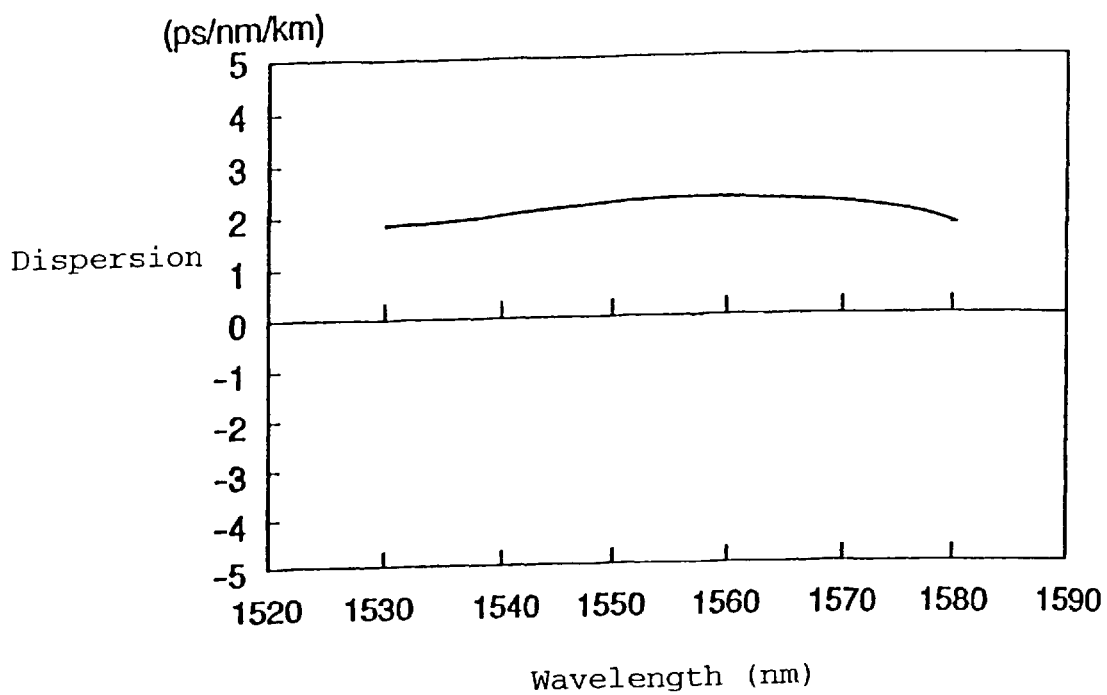
FIG. 3 is a graph showing an example of properties of the optical transmission line formed by connecting the optical fiber of the first embodiment to a 1.3 μm band zero dispersion single-mode optical fiber.

As a concrete example of an optical fiber in which the dispersion and dispersion slope in a wavelength band of 1.55 μm are negative, and the D/S value is small, the present inventor made an optical fiber in which chromatic dispersion at a wavelength of 1550 nm was −135.7 ps/nm/km, the dispersion slope in a wavelength band of 1.55 μm was −0.513 ps/nm$^2$/km, and the D/S value was set to approximately 265, and connected this optical fiber to the abovementioned single-mode optical fiber to form an optical transmission line, and as a result, the chromatic dispersion properties in this optical transmission line became as shown by the solid line of FIG. 3. This optical transmission line was formed so that the ratio of the length of the single-mode optical fiber and the length of the optical fiber was set to be 9 to 1.

As is clearly understood from the same figure, it is proved that, if the optical fiber of the present embodiment is used, the dispersion slope in the wavelength band of 1.55 μm of the single mode optical fiber could be compensated by the short optical fiber, the dispersion slope could be reduced to be almost zero, and deflection due to the chromatic dispersion could be suppressed to be low.

Furthermore, as still another concrete examples of the present embodiment, an optical fiber A, in which chromatic dispersion at a wavelength of 1550 nm was −171 ps/nm/km, dispersion slope in a wavelength band of 1.55 μm was −0.851 ps/nm$^2$/km, and the D/S value was set to approximately 200, and an optical fiber B, in which the chromatic dispersion at a wavelength of 1550 nm was −196 ps/nm/km, the dispersion slope at a wavelength of 1.55 μm was −0.109 ps/nm$^2$/km, and the D/S value was set to approximately 1798, were manufactured. Then, these optical fibers A and B were connected to the single-mode optical fiber to form an optical transmission line. As a result, the chromatic dispersion properties of this optical transmission line became as shown by the solid line of FIG. 4.

This optical transmission line was formed by connecting the single-mode optical fiber having a length of 16 km, the optical fiber A having a length of 1 km, and the optical fiber B having a length of 0.555 km. As is clearly understood from the same figure, if the optical fiber of the present embodiment is used, the chromatic dispersion and dispersion slope in the wavelength band of 1.55 μm of the single-mode optical fiber can be compensated by the optical fibers with short lengths, the dispersion slope can be reduced to be almost zero (the absolute value of the dispersion slope can be made to be ±0.01 or less), and the dispersion value can also be reduced to be almost zero.

If the single-mode optical fiber having a length of 16 km is compensated by only the optical fiber of the W-formed refractive index profile shown in FIG. 7, a length of 2.7 km becomes necessary for the optical fiber. Therefore, by using the optical fiber of the present embodiment, the required length of the optical fiber can be shortened by 40%, whereby reduction in size of a dispersion compensating device using the optical fiber and reduction in non-linear phenomenon occurring inside the optical fiber can be realized.

In Table 3, as still further examples of the present embodiment, examples (concrete examples 7 and 8) of the optical fiber in which the effective core sectional area Aeff in the wavelength band of 1.55 μm is enlarged are shown. In Table 3, relative index differences Δ1 through Δ3 are determined by the abovementioned formulas (1) through (3). In addition, values of chromatic dispersion, dispersion slope, D/S, and Aeff are determined in the same manner as in Tables 1 and 2.

TABLE 3

| | Δ1 (%) | Δ2 (%) | Δ3 (%) | a1 (μm) | a2 (μm) | a3 (μm) | Chromatic dispersion (ps/km/nm) | Aeff (μm²) |
|---|---|---|---|---|---|---|---|---|
| Concrete Example 7 | 2.8 | −0.55 | 0.96 | 2.2 | 7.3 | 10.2 | −90 | 115 |
| Concrete Example 8 | 2.3 | −0.45 | 0.75 | 2.6 | 8.4 | 10.5 | −110 | 82 |

According to these concrete examples, in comparison with the abovementioned comparative examples 1 and 2, the effective core sectional area in the wavelength band of 1.55 μm can be significantly enlarged, whereby distortion due to the non-linear phenomenon can be reduced.

In Table 4, as still further concrete examples of the present embodiment, properties of optical fibers of concrete examples 9a and 9b are shown, each of which is formed so that, as shown in FIG. 5(a), the second side core 3 is provided with an extremely-large refractive index portion, maximum refractive index point 3a of this extremely-large refractive index portion is positioned at the side of the first side core 2 from the center (C in the figure) of the width in the direction of the diameter of the second side core 3.

| | Peak position | Effective cut-off wavelength (nm) | Dispersion (ps/km/nm) | Dispersion slope (ps/km/nm²) | D/S (nm) |
|---|---|---|---|---|---|
| Concrete Example 9a | 0.07 | 1529 | −185.2 | −1.186 | 156.2 |
| Concrete Example 9b | 0.31 | 1523 | −214.1 | −0.975 | 219.6 |
| Comparative Example 3 | 0.51 | 1515 | −288.4 | 0.412 | −700.0 |
| Comparative Example 4 | 0.96 | 1526 | −140.3 | 1.916 | −73.2 |
| Comparative Example 5 | | 1519 | −3.3 | 0.152 | −21.8 |

The chromatic dispersion shown in Table 4 is the chromatic dispersion value at a wavelength of 1.55 μm, the dispersion slope is the dispersion slope at a wavelength of 1.55 μm, and D/S is the D/S value determined by dividing the dispersion value D at the wavelength of 1.55 μm by the dispersion slope S. The peak position shown in Table 4 shows the position of the maximum refractive index point 3a of the second cladding 3 as shown in FIG. 5(a) on the supposition that the position of the interface between the first side core 2 and second side core 3 is 0, and the position of the interface between the second side core 3 and outer cladding 5 is 1.

In addition, in Table 4, as comparative examples 3 and 4, properties of an optical fiber are shown in which the maximum refractive index point of the maximum refractive index point of the second side core 3 is positioned at the side of the outer cladding 5 from the center (C in the figure) of the width in the diameter direction of the second side core 3, and as comparative example 5, properties of an optical fiber with a flat distribution of the refractive index as shown in FIG. 5(b) are shown, in which the second side core 3 is provided with no extremely-large refractive index portions.

As for the optical fibers shown in Table 4, although concrete refractive index profiles are not shown, all the profiles are determined so that the effective cut-off wavelength becomes less than 1550 nm within the range of the refractive index profile determined in the first embodiment.

The present inventor found that, by setting the relative index differences Δ1, Δ2, and Δ3 and the parameters of the diameter a1 of the center core 1, diameter a2 of the first side core 2, and diameter a3 of the second side core 3 to be within the range specified in the first embodiment, the absolute value of negative dispersion and absolute value of the negative dispersion slope per unit length in the wavelength band in use of, for example, 1.55 μm were set to be large, and it becomes possible to compensate for the positive dispersion of the single-mode optical fiber over a broadband of the wavelength band in use, the effective cut-off wavelength might be at the side of a wavelength longer than the wavelength band in use depending on the set values of the abovementioned parameters.

Therefore, the present inventor variously examined how to make single-mode operation possible by setting the effective cut-off wavelength to be at the side of a wavelength shorter than the wavelength band in use, and as shown in concrete examples 9a and 9b, found that the position of the maximum refractive index point 3a of the second side core 3 was set at the side of the first side core 2 from the center of the width in the diameter direction of the second side core, whereby the effective cut-off wavelength was moved to the shorter wavelength side, and as mentioned above, the absolute value of the negative dispersion and the absolute value of the negative dispersion slope per unit length in the wavelength band in use, for example, the wavelength band of 1.55 μm could be made large.

The inventor considers the reason for this to be as follows. That is, among the propagation modes of the optical fiber, the $LP_{Om}$ (m=2, 3 . . . ) or $LP_{11}$ mode has electric field distribution in a wide range in the direction of the optical fiber diameter, so that, by setting the maximum refractive index point of the second side core 3 at the side of the first side core 2 from the center of the width in the diameter direction of the second side core 3, while influences of light transmitted through the optical fiber onto the $LP_{01}$ mode are suppressed, light is prevented from propagating in the $LP_{Om}$ mode and $LP_{11}$ mode, whereby single mode operation becomes possible.

Concrete examples 9a and 9b determine the component parameters based on this consideration, and therefore, concrete examples 9a and 9b can show the abovementioned excellent effect as shown in Table 4.

Additionally describing the results shown in Table 4, in comparative examples 3 and 4, upon setting the position of the maximum refractive index point 3a of the second side core 3 as shown in Table 4, the refractive index profile is determined so that effective cut-off wavelength becomes less than 1550 nm, whereby the dispersion slope becomes a positive value as shown in Table 4, and in addition, in comparative example 4, the absolute value of the dispersion value also becomes smaller. Furthermore, in comparative example 5, in accordance with the refractive index profile shown in FIG. 5(b), the refractive index profile is determined so that the effective cut-off wavelength becomes 1550 nm, whereby the dispersion slope becomes a positive value in the same manner as mentioned above, and the absolute value of the dispersion value becomes extremely small.

On the other hand, concrete examples 9a and 9b show the abovementioned excellent effect, wherein, by properly setting the position of the maximum refractive index point 3a of the second side core 3 at the side of the first side core 2 from the center of the width in the diameter direction of the second side core 3, desired properties can be obtained.

Figure 2:
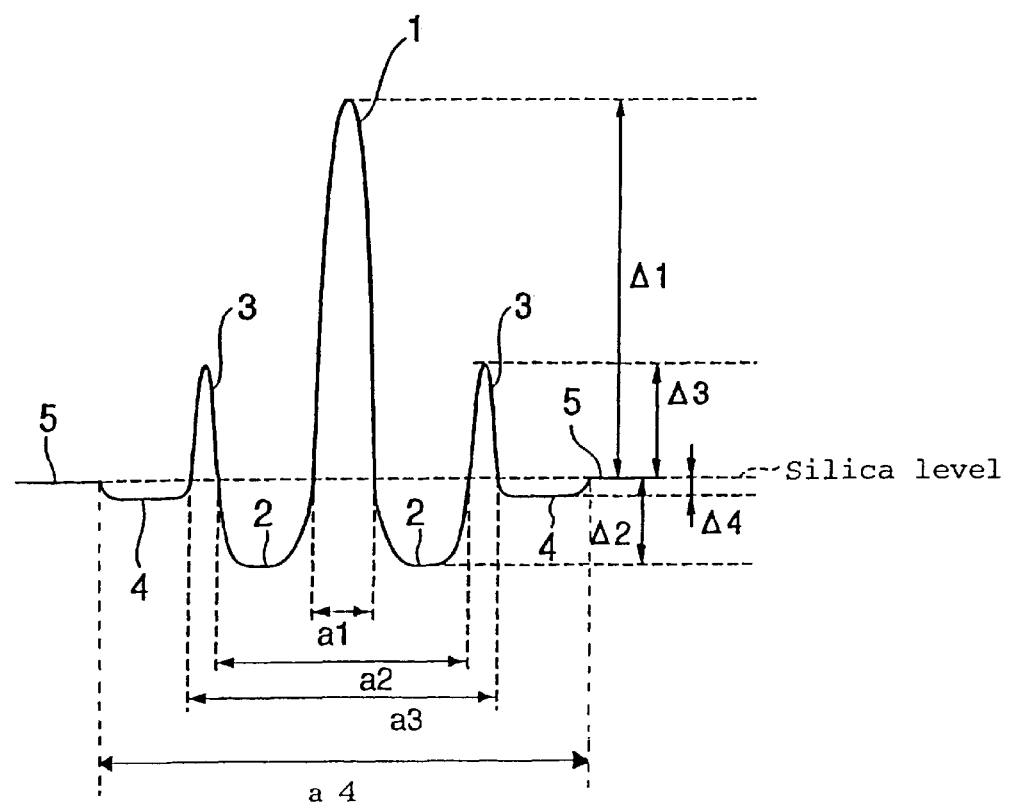
FIG. 2 is a constructional diagram showing the refractive index profile of the second embodiment of the optical fiber relating to the invention.

Next, the second embodiment of the optical fiber relating to the invention shall be described. In FIG. 2, the refractive index profile of the second embodiment is shown. The second embodiment is constructed in almost the same manner as in the first embodiment, and the characteristic points of difference of the second embodiment from the first embodiment are in that the outer circumferential side of the second side core 3 is covered by the inner cladding 4, the outer circumferential side of the inner cladding 4 is covered by the outer cladding 5, and the refractive index of the inner cladding 4 is set to be smaller than the refractive index nc of the outer cladding 5.

The refractive index of the inner cladding 4 is n4, and on the supposition that the relative index difference of the inner cladding 4 from the outer cladding 5 is Δ4, Δ4>Δ2. Δ4 is defined by the following formula (6).

$$\Delta 4 = [\{(n4)^2 - (nc)^2\}/2(nc)^2] \times 100 \quad (6)$$

The second embodiment is thus arranged, and is characterized in that, by providing the inner cladding 4 with a low refractive index at the outer circumferential side of the second side core 3, light of an $LP_{11}$ mode having electric field distribution in a wide range in the direction of the core diameter is made to easily leak to shorten the effective cut-off wavelength.

in the case where the second side core 3 with a high refractive index is provided at the circumference of the first side core 2 as in the invention, high negative dispersion and high negative slope are realized, however, depending on the refractive index profile of the optical fiber, the effective cut-off wavelength may become longer. If so, the optical fiber cannot carry out single-mode operation, so that, in order to securely prevent the effective cut-off wavelength from lengthening, the inner cladding 4 with a low refractive index is provided at the outer circumferential side of the second side core 3 as mentioned above, whereby the effective cut-off wavelength is made shorter, and the refractive index profile is determined so that the optical fiber can easily carry out single-mode operation.

CONCRETE EXAMPLE

In Table 5, as a concrete example of the second embodiment, the construction and properties of an optical fiber of concrete example 11 are shown together with concrete example 10 of the optical fiber of the abovementioned first embodiment. In addition, the relative index differences Δ1 through Δ3 are determined by the abovementioned formulas (1) through (3). The values of chromatic dispersion, dispersion slope, D/S, and Aeff are determined in the same manner as in Tables 1 and 2.

TABLE 5

| | Δ1 (%) | Δ2 (%) | Δ3 (%) | Δ4 (%) | a1 (μm) | a2 (μm) | a3 (μm) | a4 (μm) | Chromatic dispersion (ps/km/nm) | Dispersion slope (ps/km/nm²) | D/S (nm) | Aeff (μm²) | Effective cut-off wavelength (nm) |
|---|---|---|---|---|---|---|---|---|---|---|---|---|---|
| Concrete Example 10 | 2.83 | −0.59 | 0.72 | — | 2.86 | 10.2 | 12.7 | — | −200 | −1.185 | 168 | 16 | 1621 |
| Concrete Example 11 | 2.83 | −0.59 | 0.72 | −0.08 | 2.85 | 10.1 | 12.7 | 19 | −203 | −1.037 | 195 | 18 | 1468 |

As is clearly understood from this Table 5, by providing the inner cladding 4, the effective cut-off wavelength can be made shorter, and furthermore, the Aeff can be made larger. In addition, in the case where the inner cladding 4 with a low refractive index is provided at the outer circumferential side of the second side core 3, it is not always necessary that the maximum refractive index point 3a of the second side core 3 be set at the side of the first side core 2 from the center C of the width in the diameter direction of the second side core 3, however, in order to increase the diameter of the Aeff, it is desirable that the maximum refractive index point 3a of the second side core 3 is positioned at the side of the first side core 2 from the center C of the width in the diameter direction of the second side core 3.

Figure 4:
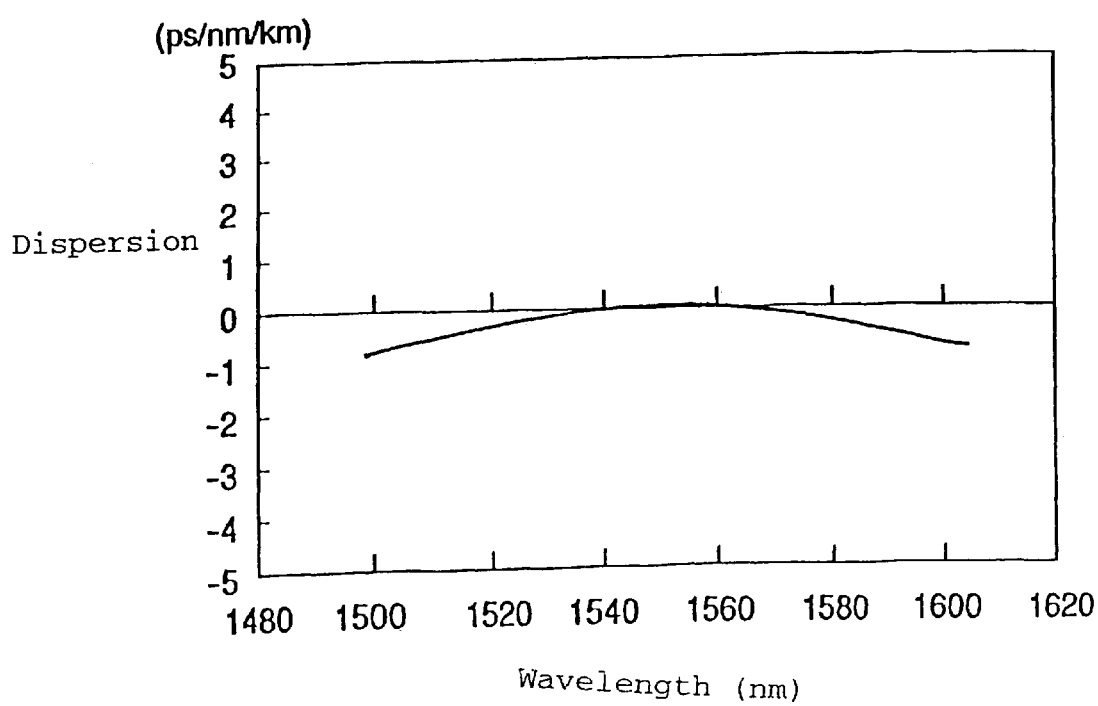
FIG. 4 is a graph showing an example of properties of the optical transmission line formed by connecting two types of optical fibers having properties different from each other of the first embodiment to a 1.3 μm band zero dispersion single-mode optical fiber, FIG. 5 are explanatory diagrams showing refractive index profiles from the optical fiber center to the middle portion of the cladding by means of a concrete example (a) of the optical fiber of the first embodiment and a comparative example (b)

The present invention is not limited to the abovementioned embodiments, but can employ various embodiments. For example, in the data shown in FIG. 4, the optical fiber of the invention whose D/S value is set to 0 to 300 and an optical fiber whose D/S value is more than 300 are connected to the single-mode optical fiber to form an optical transmission line, however, an optical transmission line can be formed by connecting the optical fiber of the invention whose D/S value is set to 0 to 300 and an optical fiber whose D/S value is negative to the single mode optical fiber, whereby, as shown in FIG. 4, the dispersion slope and dispersion value in the wavelength band in use can be reduced to be almost zero. Furthermore, only the dispersion slope in the wavelength band in use can be reduced to be almost zero. Moreover, any single mode optical fiber to be connected to the optical fiber of the invention can be used as long as it has a zero dispersion wavelength at the side of a wavelength shorter than the wavelength band in use, for example, a dispersion shifted optical fiber having minute dispersion in the wavelength band in use can be used.

Figure 5:
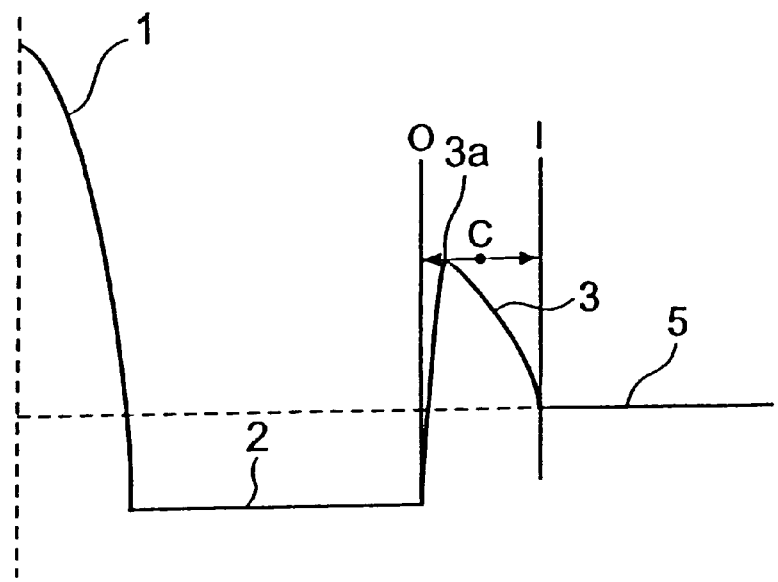
Figure 5:
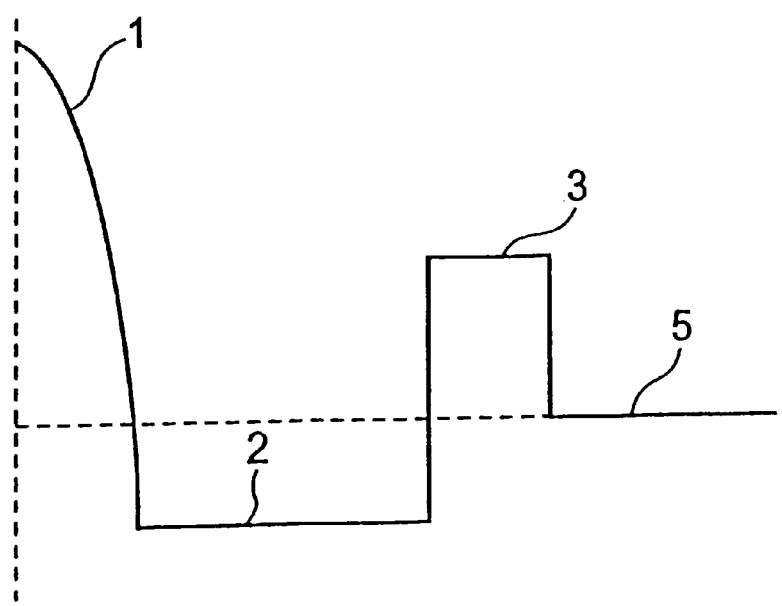

As shown in FIG. 1, FIG. 2, and FIG. 5, in the above-mentioned embodiments, the second side core 3 has one extremely-large refractive index portion, however, the number of extremely-large refractive index portions can be 2 or more. In this case as well, the maximum refractive index points of the plurality of extremely-large refractive index portions are positioned at the side of the first side core 2 from the center of the width in the diameter direction of the second side core 3, whereby the optical fiber as shown in FIG. 9a or 9b in which the absolute value of the negative dispersion and absolute value of negative dispersion slope are set to be large while the effective cut-off wavelength is at the side of a short wavelength can be realized.

Industrial Applicability

As described above, the optical fiber of the invention is suitable for compensating the positive dispersion and positive dispersion slope of light signals at the wavelength band of 1.55 μm to be transmitted through a single-mode optical fiber having zero dispersion in a wavelength band of, for example, 1.3 μm at the side of a wavelength shorter than the wavelength band in use by means of a short length. In addition, the optical transmission line relating to the invention makes zero dispersion at the receiver side possible for wavelength multiplexed light having various wavelengths (in particular, light in a wavelength band of 1.55 μm), and suppresses the non-linear phenomenon, and therefore, is suitable as an optical transmission line for high quality, high-rate and large-capacity wavelength multiplex transmissions.

What is claimed is:

1. An optical fiber formed so that the outer circumferential side of a center core is covered by a first side core, the outer circumferential side of said first side core is covered by a second side core, and the outer circumferential side of said second side core is covered by an outer cladding, wherein, when the maximum refractive index of the center core is n1, the minimum refractive index of the first side core is n2, the maximum refractive index of the second side core is n3, and the refractive index of the outer cladding is nc, n1>n3>nc>n2, when the relative index difference of the center core from the outer cladding is Δ1, the relative index difference of the first side core from the outer cladding is Δ2, and the relative index difference of the second side core from the outer cladding is Δ3, 1.7%≦Δ1, Δ2≦−0.3%, and 0.25%≦Δ3, the value A, determined by dividing the diameter a1 of the center core by the diameter a2 of the first side core, is 0.15≦A≦0.5, and the value B, determined by dividing the diameter a3 of the second side core by the diameter a2 of the first side core, is 1<B≦2.

2. An optical fiber as set forth in claim 1, wherein the second side core has one or more extremely-large refractive index portions, and the maximum refractive index points of the extremely-large refractive index portions are positioned at the side of the first side core from the center of the width in the diameter direction of the second side core.

3. An optical fiber as set forth in claim 1, wherein the outer circumferential side of the second side core is covered by an inner cladding, the outer circumferential side of said inner cladding is covered by the outer cladding, and the refractive index of the inner cladding is set to be smaller than that of the outer cladding.

4. An optical fiber as set forth in claim 2, wherein the outer circumferential side of the second side core is covered by an inner cladding, the outer circumferential side of said inner cladding is covered by the outer cladding, and the refractive index of the inner cladding is set to be smaller than that of the outer cladding.

5. An optical fiber as set forth in claim 1, wherein chromatic dispersion in the wavelength band in use is set to be less than −120 ps/nm/km.

6. An optical fiber as set forth in claim 2, wherein chromatic dispersion in the wavelength band in use is set to be less than −120 ps/nm/km.

7. An optical fiber as set forth in claim 3, wherein chromatic dispersion in the wavelength band in use is set to be less than −120 ps/nm/km.

8. An optical fiber as set forth in claim 4, wherein chromatic dispersion in the wavelength band in use is set to be less than −120 ps/nm/km.

9. An optical fiber as set forth in any one of claims 1 through 8, wherein the D/S value determined by dividing the chromatic dispersion D in the wavelength band in use by the chromatic dispersion slope S is set to 0 to 500 nm.

10. An optical fiber as set forth in any one of claims 1 through 8, wherein the D/S value determined by dividing the chromatic dispersion D in the wavelength band in use by the chromatic dispersion slope S is set to 0 to 300 nm.

11. An optical fiber as set forth in claim 5, wherein the wavelength band in use is set to be a wavelength band of 1.55 μm.

12. An optical fiber as set forth in claim 6, wherein the wavelength band in use is set to be a wavelength band of 1.55 μm.

13. An optical fiber as set forth in claim 7, wherein the wavelength band in use is set to be a wavelength band of 1.55 μm.

14. An optical fiber as set forth in claim 8, wherein the wavelength band in use is set to be a wavelength band of 1.55 μm.

15. An optical fiber as set forth in claim 9, wherein the wavelength band in use is set to be a wavelength band of 1.55 μm.

16. An optical fiber as set forth in claim 10, wherein the wavelength band in use is set to be a wavelength band of 1.55 μm.

17. An optical transmission line, wherein the optical fiber as set forth in any one of claims 1 through 16 is connected to a single-mode optical fiber having zero dispersion in a wavelength band at the side of a wavelength shorter than the wavelength band in use, whereby the dispersion slope in the wavelength band in use is made almost zero.

18. An optical transmission line, wherein the optical fiber as set forth in any one of claims 1 through 16 and an optical fiber whose D/S value determined by dividing the chromatic dispersion D by the chromatic dispersion slope S is more than 300 nm or an optical fiber whose D/S value is negative are connected to a single-mode optical fiber having zero dispersion in a wavelength band at the side of a wavelength shorter than the wavelength band in use, whereby the dispersion slope and dispersion value in the wavelength band in use are made almost zero.

* * * * *

UNITED STATES PATENT AND TRADEMARK OFFICE
CERTIFICATE OF CORRECTION

PATENT NO.    : 6,404,967 B2                                                    Page 1 of 1
DATED         : June 11, 2002
INVENTOR(S)   : Arai et al.

It is certified that error appears in the above-identified patent and that said Letters Patent is hereby corrected as shown below:

<u>Title page,</u>
Item [30], should read:

-- [30]        Foreign Application Priority Data

Apr. 19, 2000  (JP) ………………………….. 2000-118217
       May 17, 1999  (JP) ……………………………  11-135799 --

Signed and Sealed this

Thirty-first Day of December, 2002

JAMES E. ROGAN
*Director of the United States Patent and Trademark Office*